Feb. 8, 1966     C. J. FLETCHER     3,233,547
RECOVER SYSTEM FOR ROCKET BOOSTERS
Filed Jan. 28, 1963     2 Sheets-Sheet 1

INVENTOR.
CHARLES J. FLETCHER

Feb. 8, 1966  C. J. FLETCHER  3,233,547
RECOVER SYSTEM FOR ROCKET BOOSTERS
Filed Jan. 28, 1963  2 Sheets-Sheet 2

INVENTOR.
CHARLES J. FLETCHER
BY
AGENT

United States Patent Office 3,233,547
Patented Feb. 8, 1966

3,233,547
RECOVERY SYSTEM FOR ROCKET BOOSTERS
Charles J. Fletcher, Sparta, N.J., assignor to Thiokol Chemical Corporation, Bristol, Pa., a corporation of Delaware
Filed Jan. 28, 1963, Ser. No. 254,267
11 Claims. (Cl. 102—49)

This invention relates generally to booster recovery systems for rocket vehicles such as missiles or aircraft and more particularly to a rotor system for the booster stage of large rockets which will permit it to autorotate safely back to earth and thus save one of the most expensive components of the missile.

Various devices for separating the bow or payload section of a cargo carrying missile from its rocket engine body and allowing it to drop relatively slowly and safely to earth are known in the art. However, only relatively recently has there been any interest in the recovery of the aft portion of the rocket missile or booster stage by permitting it to autorotate back to earth.

This aspect of recovery involves problems of blade loading, blade root reinforcement, added weight and complexity in applying a large diameter rotor system to the booster stage for substantially obvious reasons. Conventional blades would probably be destroyed during landing due to their large radius. Also, since such blades are of cantilever design, considerable blade root structure is required and this adds weight and complexity of design.

Accordingly, the main object of the present invention is to provide a rotor system for the recovery of the booster stage of large diameter rockets which will eliminate the above and other obstacles to a practical and successful recovery of the booster stage.

An important object of the present invention is to provide a cyclo-gyro rotor system for the recovery of the booster stage of large rockets which automatically operates upon separation of the booster from the missile and lowers the booster gently and safely to the earth.

Another important object of the present invention is to provide a compact extensible cyclo-gyro rotor system for the booster stage of a rocket missile which is retracted close to the booster propellant tankage during launch and which is automatically extended upon booster break away to autorotate the booster safely back to earth.

A further important object of the present invention is to provide a cyclo-gyro rotor system of the type described in which the rotor blades are automatically adjustable for maximum vertical lift and each embodies its own automatically operable power system to increase the lift just prior to earth touchdown of the booster.

A still further important object of the present invention is to provide a cyclo-gyro rotor system of the type described in which the rotor blades are supported at each end to increase their strength while preserving a minimum of weight and complexity of design.

Another important object of the present invention is to provide a rocket missile booster having a spaced separable shell which:

(1) is a part of the streamlined outer missile shell;
(2) automatically separates from the booster as it breaks away from the missile upon conclusion of booster phase; and
(3) uncovers automatically extending booster attached cyclo-gyro rotors which autorotate the booster safely back to earth.

Other objects and advantages of the invention will become apparent during the course of the following description.

In the drawings I have shown one embodiment of the invention. In this showing:

Figure 1:
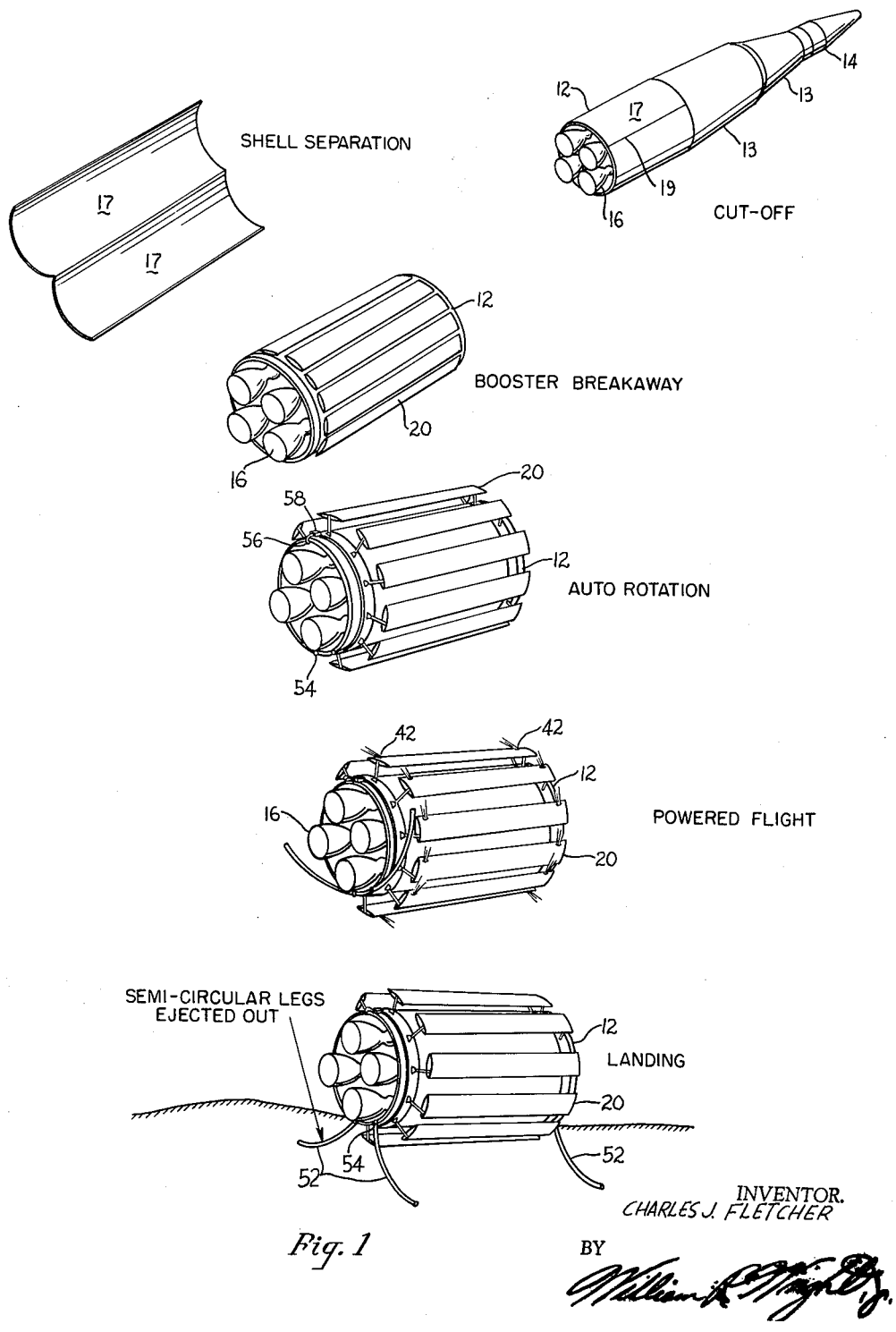
FIGURE 1 is a schematic view of a rocket missile whose booster is equipped with the cyclo-gyro rotors of the present invention and showing the various phases of the sequential steps involved in lowering the booster safely to earth.

Referring to the drawings, numeral 10 designates a large diameter rocket missile having a booster stage 12, one or more additional stages 13, and a payload 14 which may be a man-carrying, instrument or cargo capsule or a warhead. The booster stage is provided with a cluster of rocket engines including tanks 15 and each terminating in a thrust nozzle 16.

The booster stage 12 is provided with an enclosing shell forming a part of the vehicle streamlining and having 2 or more sections 17 (FIGURE 1) adapted to be explosively separated by charges 18 placed on the bottom shell surface along lines 19 defining the separable sections. Ignition of the charges 18 is effected simultaneously with and by the same means normally provided to ignite the schematically indicated explosive bolts 21 or other conventional means which temporarily connect a jettisonable booster to a rocket vehicle until termination of booster phase operation.

Figure 2:
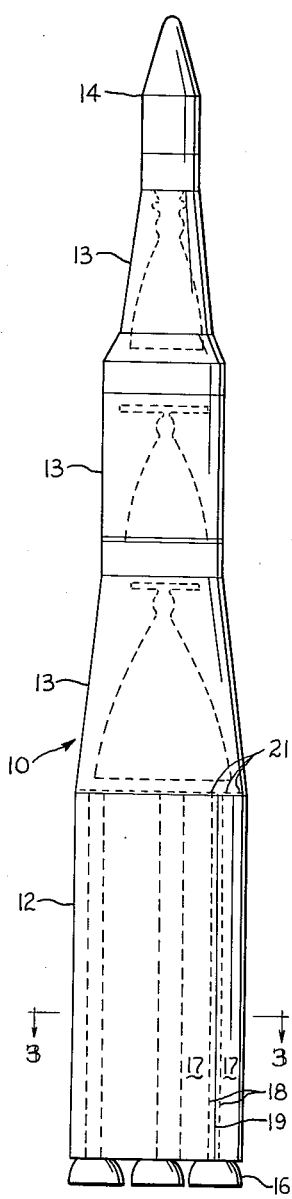
FIGURE 2 is a side elevational view of a large, multistage rocket missile with the separable booster shell retaining the enclosed cyclo-gyro rotors in retracted position.
Figure 3:
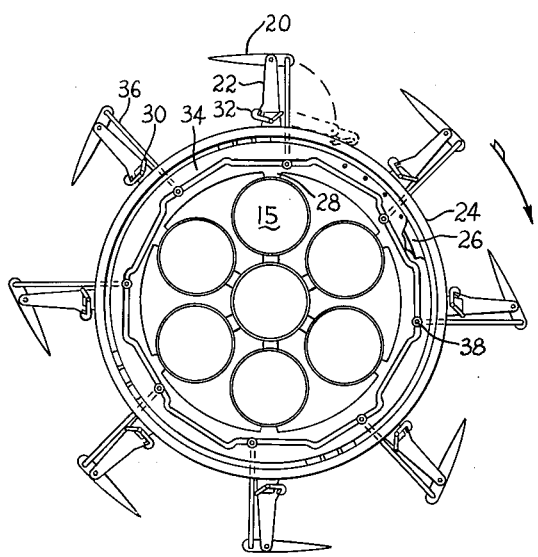
FIGURE 3 is a transverse sectional view of the rocket booster showing the manner in which the rotor blades move from folded or retracted position to operative position.

The separable shell sections 17 are spaced from the periphery of the booster stage motor tankage 15 so as to enable the housing therebetween of a self-powered and booster stage supporting cyclo-gyro system which includes a set of cyclo-gyro rotors 20 in a retracted or folded condition (FIGURES 2 and 3). Each rotor 20 is of airfoil cross section and extends in peripheral spaced relationship to the other rotors, substantially the length of the booster stage rocket engines and is supported at its ends by a pair of arms 22 each of which is pivotally connected to the rotor and to a stud 23 on the outer race 24 of a ball bearing, the inner race 26 of which is mounted on the tankage 15 by means of spacers 28 for reasons which will become apparent.

The stud 23 of each rotor supporting arm 22 includes a torsion spring 30 acting on the arm so that when the restraining shell sections 17 are blown off by the charges 18, each rotor is moved from the folded dotted line position along the dotted line to the unfolded operative position shown in FIGURE 3. Each of the rotors 20 is locked in the extended operative position by spring detent and catch means designated generally as 32.

In order that the cyclo-gyro rotors 20 offer a maximum of vertical lift to the booster stage 12 during autorotation of the rotors in lowering it to the earth, it is necessary to change the pitch or angle of the rotors as they rotate in the ball bearing race about the booster stage 12. This is effected by mounting a cam track 34 on the periphery of the tankage 15 and between it and adjacent each of the inner ball bearing races 26. A pitch changing link 36 having a roller 38 at its lower end to travel in the cam track 34, is pivotally connected at its upper end to a point forwardly spaced from the pivot point of the arm 22 (rotation-wise) of each end of each rotor 20.

It will be appreciated that each rotor must be so disposed as to have a relatively high value of specific lift in the upper portion of its circle of rotation and a negative value of specific lift in the lower portion where it is inverted. This is effected with a minimum of frictional resistance by the cam track 34 and the pitch change link 36 as each cyclo-gyro rotor 20 and its supporting arms 22 move in the roller bearing races about the periphery of the booster stage 12.

As stated, it is desirable that the rotors 20 effect a soft landing of the booster stage 12 so as to avoid damage to this highly expensive rocket component and to this end means are provided to obtain a momentary increase in the aerodynamic lift of the rotors 20 just prior to the return to earth.

Figure 4:
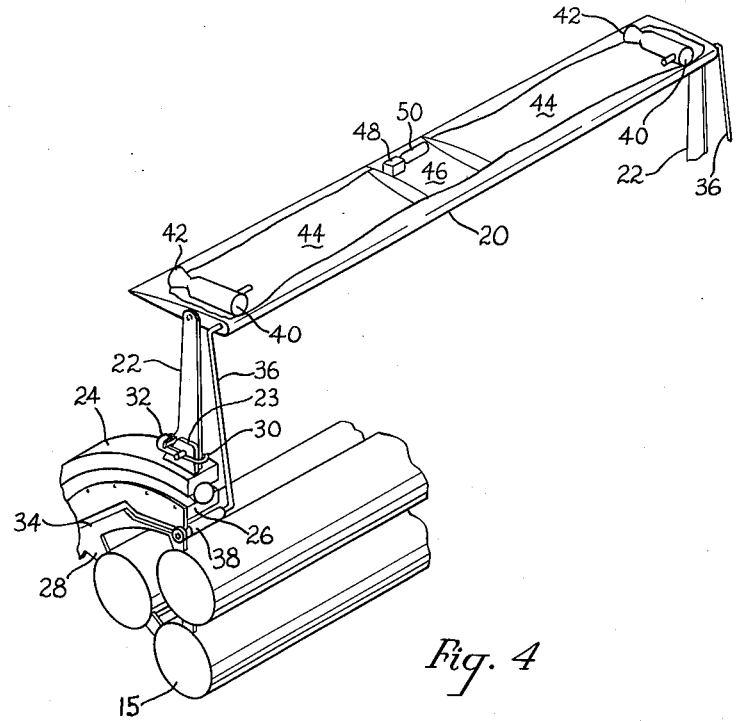
FIGURE 4 is a perspective view partially broken away of one of the cyclo-gyro rotor blades and its powerplant.

As seen in FIGURE 4, a small rocket motor 40 having a thrust nozzle 42 is mounted on the end of each of the rotors 20 and communicates with hydrogen peroxide rotor tanks 44 which are spaced by and in communication with a burst disc sealed nitrogen tank 46. An altitude-sensing device 48, set for an altitude of 1,000 feet, is mounted adjacent a nitrogen tank pressurizing charge 50 (both shown schematically) in each rotor 20 so as to automatically pressurize the hydrogen peroxide in the tanks 44 and deliver it to the rocket motors 40 which contain a silver catalyst.

The resultant decomposition of the hydrogen peroxide in the motors generates a reactive thrust sufficient to increase the r.p.m. of the cyclo-gyro rotors 20 for approximately 50 seconds duration to the extent that the increase in aerodynamic lift is sufficient to decrease the rate of descent of the booster stage to effect a soft landing.

As illustrated in FIGURE 1 but omitted from the other figures for the sake of clarity, a pair of semi-circular legs 52 are pivotally mounted on each end of the booster stage 12 as at 54. The legs 52 are spring urged to the open latched, booster supporting position shown in the landing phase of FIGURE 1, from a folded position during autorotation where they are held by a latch 56 controlled by another altitude-sensing device 58 (both shown schematically) also set to release the latch at an altitude of 1,000 feet. Thus the movement of the legs 52 to their landing position is substantially coincidental with the operation of the rocket motors 40.

The operation of the multi-stage rocket vehicle 10 described is believed to be readily apparent. The vehicle is launched and immediately after the booster stage is burned out, the conventional explosive bolts are fired to separate the booster stage 12 from the vehicle 10. The shaped charge 18 along the shell lines 19 are then fired by means of an electrical signal to blow off the shell in the segments 17 and permit the spring actuated extension means to operate, thus moving cyclo-gyro rotors 20 into their locked-up position.

The booster stage 12 then starts its descent toward the earth with the cyclo-gyro rotors 20 autorotating. As the booster 12 reaches an altitude of approximately 1,000 feet, the altitude-sensing device 48 triggers off the charge 50 which pressurizes the rotor blade nitrogen tank 46 to force hydrogen peroxide to the spanwise rocket engines 40. The silver screen catalyst in the motors 40 decomposes the hydrogen peroxide into steam and oxygen which issue from the thrust nozzles 42 to create a propulsive thrust for the rotor and thust to increase the aerodynamic lift of the rotors and to thereby decrease the rate of descent of the booster 12.

Simultaneously with the energizing of the rockets 40, the altitude-sensing device 58 releases the latch 56 retaining the supporting legs 52 in the folded position and permits them to be spring actuated to and locked in the landing position. The rocket booster stage 12 is thus lowered to a soft landing and its cyclo-gyro rotor system and other structure is protected from damage by landing contact with the earth due to the supporting legs 52.

It will now be readily apparent that the booster stage 12 is aerodynamically compatible with the rocket vehicle 10 as it embodies a cyclo-gyro rotor system which offers a compact design since it is made to retract close to the booster propellant tanks during launch. The blade design is also less complex since the rotor blades are supported at both ends.

It is to be understood that the form of the invention herewith shown and described is to be taken as a preferred example of the same and that various changes in the shape, size and arrangement of part may be resorted to without departure from the spirit of the invention or the scope of the subjoined claims.

I claim:

1. In combination, a multi-stage rocket vehicle having a primary booster stage adapted to be separated from the vehicle upon termination of booster stage operation, a self extensible cyclo-gyro rotor system including rotor blades supported at each of their ends mounted on said booster and held in retracted position thereon by the outer shell thereof, said shell including lines of separation, and means for effecting separation of said booster stage from the vehicle and said outer shell from said booster stage along said lines to permit extension of said system to operable position to autorotate said booster stage to earth.

2. The combination recited in claim 1 wherein said system includes means automatically operable at a predetermined altitude to increase the rotary speed and aerodynamic lift of said system.

3. The combination recited in claim 2 wherein said last-mentioned means comprises a reaction motor mounted on a rotor of said system, and altitude-sensing means for supplying propellant to and activating said motor.

4. The combination recited in claim 1 wherein said system includes self extensible, booster stage supporting legs latched in retracted position, and means automatically operable at a predetermined altitude to unlatch said legs for movement by gravity to extended position.

5. The combination recited in claim 1 wherein said system includes self extensible, booster stage supporting legs latched in retracted position, and means automatically operable at a predetermined altitude to increase the rotary speed and aerodynamic lift of said systems and to unlatch said legs for movement by gravity to extended position.

6. The combination recited in claim 1 wherein the booster shell retains said rotors in inoperative position, and an explosive charge is fixed to the inner surface of said shell to effect removal thereof upon ignition effected by the breakaway of said booster stage to permit movement of said blades to operative position.

7. A cyclo-gyro rotor system for autorotatively lowering to earth a portion of a rocket vehicle separated therefrom in flight comprising a pair of spaced raceways encircling the periphery of said rocket vehicle portion, a plurality of circumferentially spaced rotors arranged longitudinally of said portion and coextensive with the spacing of said raceways, a rotor supporting arm pivotally mounted on each of said raceways and pivotally connected to the ends of each of said rotors, a cam track mounted on said portion adjacent each of said raceways, and rotor pitch adjusting links having a lower end including a roller movable in said cam track and an upper end pivoted to each end of said rotors at a point spaced from the pivot connection of said arms to vary the pitch of said rotors as they rotate about said portion to afford maximum vertical aerodynamic lift.

8. The system recited in claim 7 wherein at least one of said rotors includes means automatically operable at a predetermined altitude to increase the rotary speed and aerodynamic lift of said system.

9. The system recited in claim 8 wherein said means comprises a reaction motor, and altitude-sensing means for supplying propellant to and activating said motor.

10. The system recited in claim 7, and self extensible, separated vehicle-portion-supporting legs latched in retracted position, and means automatically operable at a predetermined altitude to unlatch said legs for movement by gravity to extended position.

11. The system recited in claim 7, self extensible, separated-vehicle-portion-supporting legs latched in retracted position, and means automatically operable at a predetermined altitude to increase the rotary speed and aerodynamic lift of said system and to unlatch said legs for movement by gravity to extended position.

References Cited by the Examiner

UNITED STATES PATENTS

| | | | |
|---|---|---|---|
| 1,880,586 | 10/1932 | Tiling | 244—138.1 |
| 2,684,219 | 7/1954 | Thunbo | 244—140 |
| 2,990,149 | 6/1961 | Samms | 244—138.1 |
| 2,996,985 | 8/1961 | Kratzer | 102—7.2 |
| 3,057,589 | 10/1962 | Nutkins | 244—138.1 |
| 3,101,121 | 8/1963 | MacNeal | 244—138.1 |

FOREIGN PATENTS 342,071   1/1931   Great Britain.

BENJAMIN A. BORCHELT, *Primary Examiner.*
SAMUEL FEINBERG, *Examiner.*